United States Patent [19]

Fuchs

[11] 4,152,407
[45] * May 1, 1979

[54] PROCESS AND APPARATUS FOR EXOTHERMIC REACTIONS

[76] Inventor: Warren Fuchs, 107 Cherry La., Syosset, N.Y. 11791

[*] Notice: The portion of the term of this patent subsequent to Mar. 2, 1993, has been disclaimed.

[21] Appl. No.: 764,714

[22] Filed: Feb. 2, 1977

[51] Int. Cl.² .......................... B01J 8/00; C01B 22/00; C07C 29/16; C01C 1/04
[52] U.S. Cl. ..................................... 423/360; 423/148; 423/533; 423/655; 260/449 M; 260/449.5
[58] Field of Search .................. 423/212, 213.2, 213.5, 423/213.7, 235, 239, 359, 360, 361, 362, 532, 533, 535, 659, 655, 656; 23/288 K, 288 R, 289; 260/449 R, 449 M, 449.5, 449.6 R, 449.6 M

[56] References Cited
U.S. PATENT DOCUMENTS

| 3,366,461 | 1/1968 | Christensen | 23/289 |
| 3,443,896 | 5/1969 | Furkert et al. | 423/521 |
| 3,595,619 | 7/1971 | Slater et al. | 423/656 |
| 3,941,869 | 3/1976 | Fuchs | 423/533 |
| 3,977,833 | 8/1976 | Collina et al. | 23/288 R |
| 3,997,655 | 12/1976 | Reh et al. | 423/533 |
| 3,998,932 | 12/1976 | Collina et al. | 423/359 |

Primary Examiner—O. R. Vertiz
Assistant Examiner—Thomas W. Roy
Attorney, Agent, or Firm—Kirschstein, Kirschstein, Ottinger & Corbin

[57] ABSTRACT

Exothermic reaction of a fluid stream is carried out with recycle and addition of hot reacted fluid to the colder feed fluid stream, so as to raise the feed fluid stream to operable reaction temperatures and produce optimum reaction rate. The addition of hot reacted fluid is carried out by reactor-internal ejector-effected aspiration of a portion of the hot reacted fluid discharged from the reaction zone into the cold feed fluid. The resulting combined fluid stream is passed to the reaction zone. The balance of the hot reacted fluid not aspirated into the cold feed fluid is passed to product recovery or utilization. The invention is especially applicable to exothermic catalytic reactions.

10 Claims, 12 Drawing Figures

PROCESS AND APPARATUS FOR EXOTHERMIC REACTIONS

BACKGROUND OF THE INVENTION

1. Field of the Invention

The invention relates to processes which entail an exothermic reaction of a fluid process stream, and is especially applicable to exothermic catalytic reactions such as the oxidation of sulfur dioxide to sulfur trioxide, ammonia or methanol synthesis, methane from the reaction of carbon oxides plus hydrogen, hydrogen from the reaction of carbon monoxide plus water vapor, or the catalytic elimination of residual nitrogen oxides from the tail gas discharged from nitric acid production by reaction of the nitrogen oxides with a reducing gas such as methane or hydrogen. In these various and similar reactions, the cold feed gas must be heated to a suitable ignition temperature to initiate the reaction, and excessively high reaction temperatures must be avoided.

2. Description of the Prior Art

The use of ejectors or aspirators for recycling and mixing in various processes is described in Gillespie, G. R. et al. "Catalytic Purification of Nitric Acid Tail Gas" AIChE Meeting (Dec. 2, 1971) page 8 and FIG. 7 and in Kirk-Othmer "Encyclopedia of Chemical Technology" Interscience-Wiley (1964) Edition-2, Volume-4, pages 410–412 and in Foster Wheeler Corp. Bulletin 0-54-1 (1954) pages 8 and 9. The general prior art practice with respect to ejectors or aspirators for recycling and mixing in conjunction with exothermic reactions has been to pass the effluent stream from the immediate reaction zone to a zone or zones where cooling at least in part is effected either purposefully and desirably as in cases to obtain product condensation and removal as in the Foster Wheeler reference, or again purposefully and desirably as in cases to obtain process requisite heat transfer as in the Kirk-Othmer reference, or involuntarily and undesirably as in cases of thermal losses to ambient as resulting from the Gillespie et al method of application. All of the referenced prior art practices are accompanied furthermore by relatively long flow path and significant pressure loss.

The use of fans or blowers for recycling and mixing in various processes is described in Nonhebel, G. "Gas Purification Processes", George Newnes Ltd. (1964) pages 432, 450, 451 and in Kohl & Riesenfeld "Gas Purification", McGraw Hill Inc. (1960) pages 473 and 479. The general prior art practice with respect to fans or blowers for recycling and mixing in conjunction with exothermic reactions has been limited in application according to temperature and pressure restrictions for the fans or blowers and to the unavoidably cumbersome nature of such installations.

Apparatus for exothermic catalytic reactions is described in U.S. Pat. Nos. 3,498,752; 3,475,137; 3,443,910; 3,433,600; 3,366,461; 3,366,460; 3,212,862 and 3,041,151. Processes for elimination of nitrogen oxides from nitric acid plant tail gas are described in U.S. Pat. Nos. 3,565,575; 3,467,492; 2,970,034 and 3,443,910. Improvements in catalytic methanol synthesis are disclosed in U.S. Pat. Nos. 3,597,465; 3,531,266 and 3,186,145, and improvements in catalytic ammonia synthesis are described in U.S. Pat. Nos. 3,349,569 and 3,232,707.

Sulfuric acid process improvements are described in U.S. Pat. Nos. 3,653,828; 3,536,446; 3,519,388; 3,475,120; 3,455,652; 3,432,263; 3,350,169; 3,172,725 and 3,147,074. Nitric acid production or analogous processing is described in U.S. Pat. Nos. 3,542,510; 3,499,734 and 3,102,788.

SUMMARY OF THE INVENTION

In the present invention, typically as applied to an exothermic reaction, the hot reacted fluid discharged from the reaction zone is divided into two portions. A first portion of the hot reacted fluid is utilized to heat the cold feed fluid to optimum reaction temperature or to ignition temperature, by immediate to reaction zone, reactor-internal, ejector-effected aspiration of the first reacted fluid portion into the cold feed fluid stream, so as to minimize thermal and pressure losses while heating the feed fluid and providing a combined fluid stream at optimum temperature for initiation or attainment of the exothermic reaction. The combined fluid stream is then passed to the reaction zone. The second portion of the hot reacted fluid stream is passed to product utilization.

In a preferred embodiment, the process fluid is gaseous and the reaction zone is catalytic, such as a bed of solid catalyst particles or a honeycomb element, and an exothermic catalytic reaction takes place between components in the gaseous process stream within the reaction zone, so that a gaseous product component is formed and discharged in the hot reacted gas stream. Thus, the process of the present invention is especially applicable to exothermic catalytic reactions such as ammonia or methanol synthesis, elimination of nitrogen oxides from the tail gas of a nitric acid production process by catalytic reaction with reducing gas, or the catalytic oxidation of sulfur dioxide to sulfur trioxide in sulfuric acid manufacturing processes. In the latter instance, the present process is particularly applicable when the sulfur dioxide-containing gas stream is derived from metallurgical processing such as sulfide ores or concentrates or mattes roasting or smelting or converting, in the usual practice of which the initial gas stream is at low temperature due to scrubbing with water or the like for removal of entrained dust particles.

The key advantages of the system derive from the shortening of the heretofore fixed and controlling lengths of conventional equilibrium-plot temperature versus conversion lines. The shortening is directly proportional to the ratio of makeup gas to recycle plus makeup. For a 2/1 recycle to makeup ratio the shortening is therefore to $\frac{1}{3}$ of original length. The result is a valuable tool opening previously unavailable options for optimizing the straddle between slow reaction rates at kindling temperature on the low side and catalyst or equilibrium over-temperature limitations on the high side. For cases in which the feed gases are initially colder than kindling temperature the expanded options apply also to reductions in heat exchanger requirements for feed-gas preheating.

It is an object of the present invention to provide an improved process and apparatus for carrying out exothermic reactions.

Another object is to provide improvements in process and apparatus for exothermic catalytic reactions such as ammonia or methanol synthesis, sulfur dioxide oxidation and the elimination of nitrogen oxides from nitric acid plant tail gases by reaction with reducing gas.

A further object is to provide an improvement in the recycling of hot reacted fluid from a reaction zone into cold feed fluid to the reaction zone by means of an integral reaction-vessel-contained ejector-effected aspirator.

An additional object is to heat cold feed fluid to a catalysis zone for exothermic catalytic reaction in an improved manner.

Still another object is to utilize, immediate to an exothermal reaction zone and minimizing thermal and pressure losses, a portion of the hot reacted fluid from such reaction zone to heat cold feed fluid to said zone in an improved process and apparatus.

These and other objects and advantages of the present invention will become evident from the description which follows:

DESCRIPTION OF THE DRAWINGS AND PREFERRED EMBODIMENTS

Referring now to the drawings, typical arrangements of application of the present invention to an exothermic catalytic reaction are illustrated.

Figure 4:
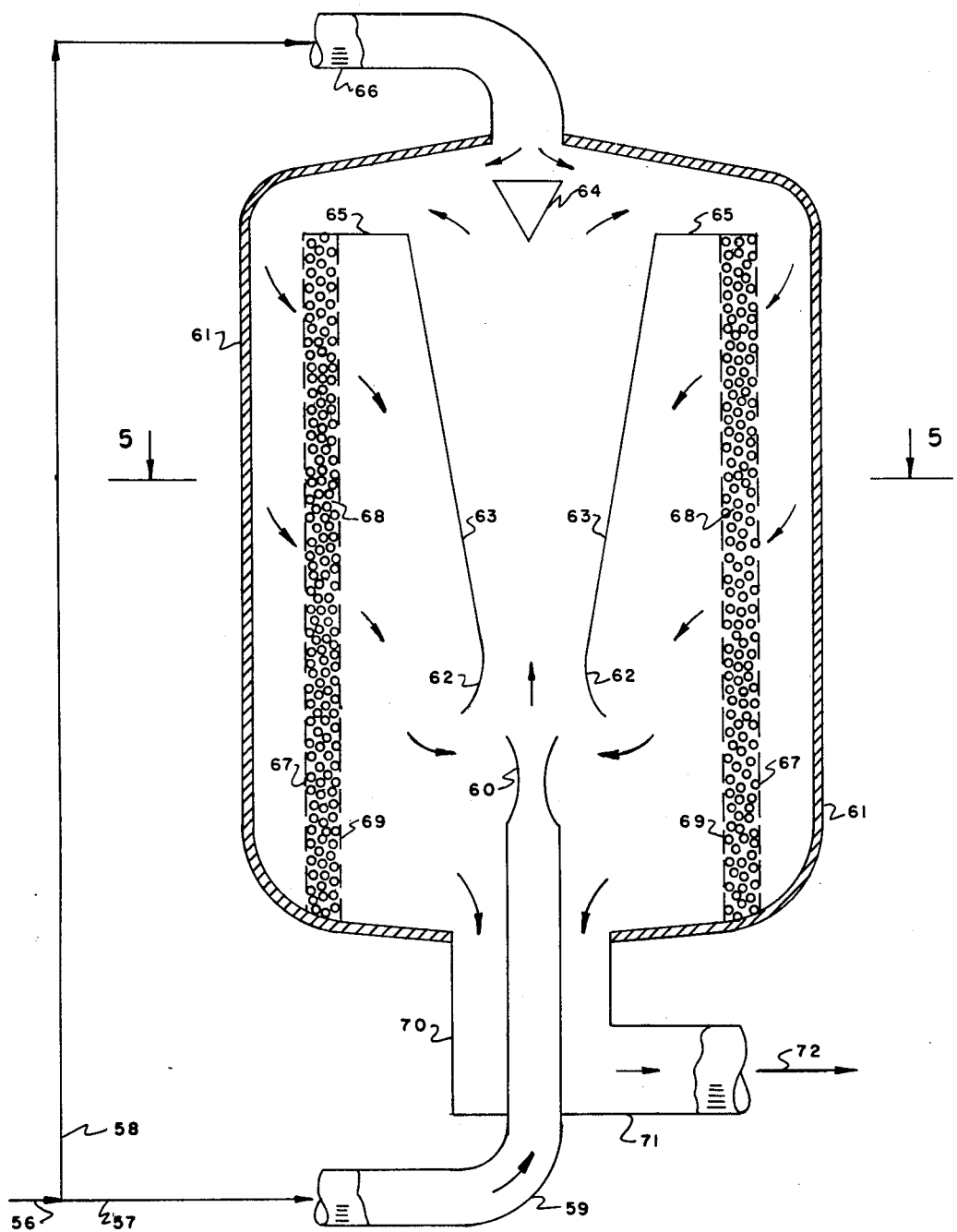
Figure 5:
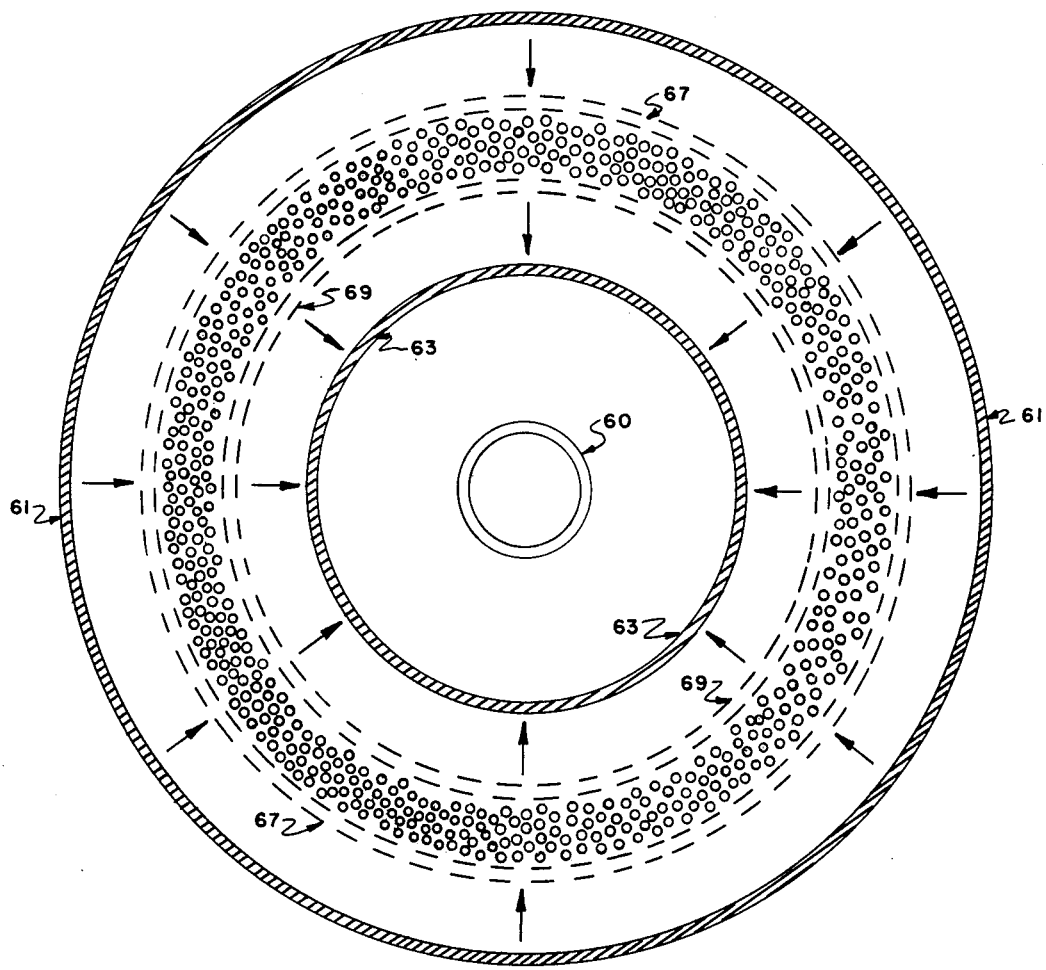
Figure 6:
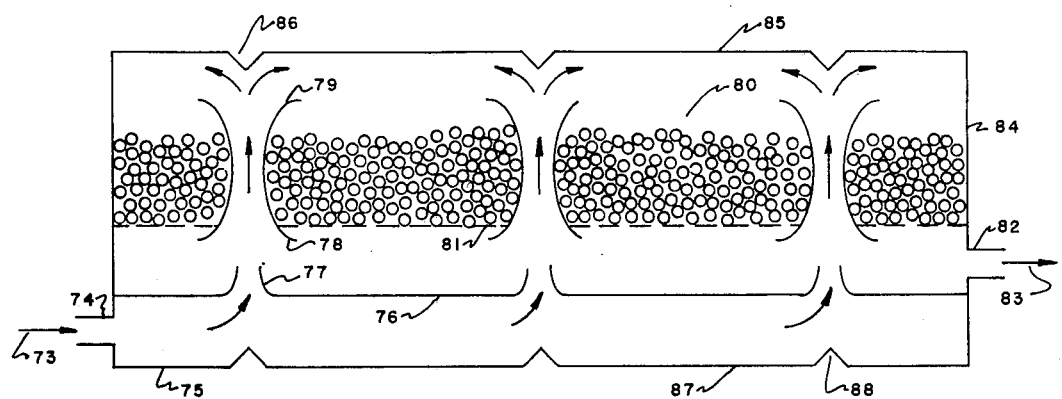
Figure 7:
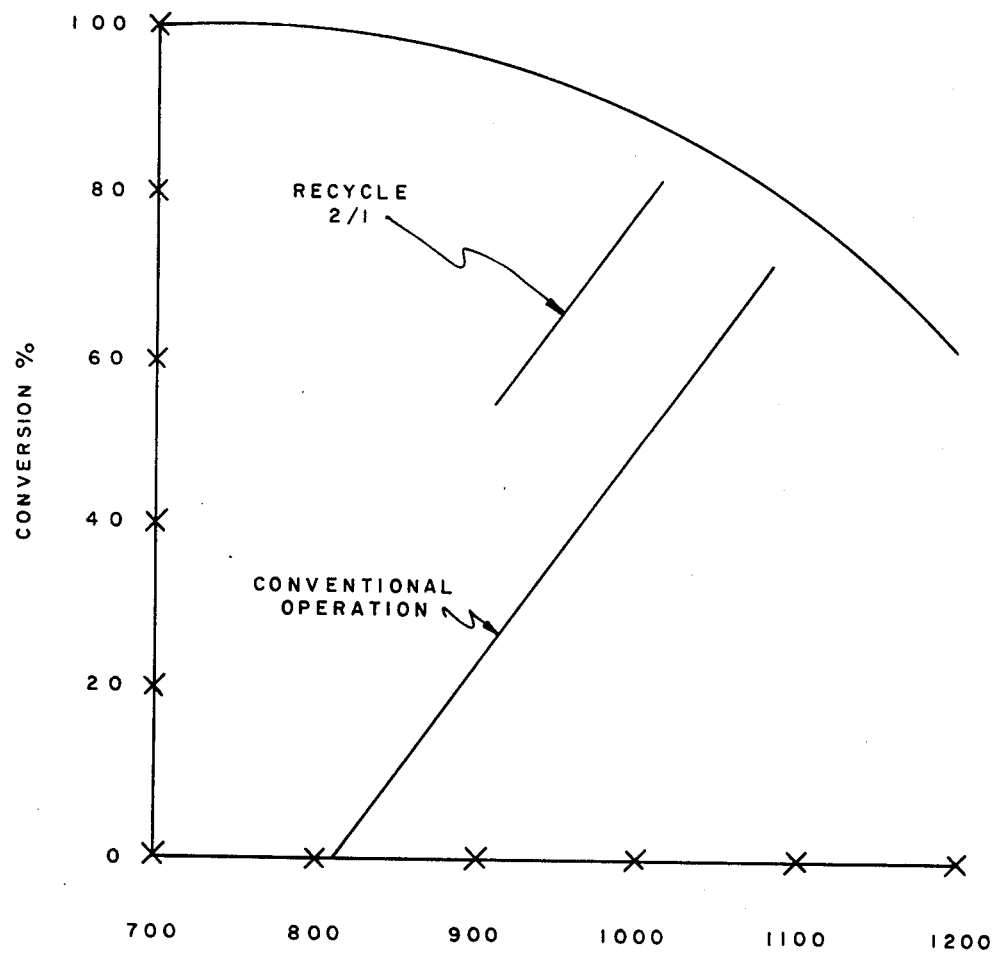
Figure 8:
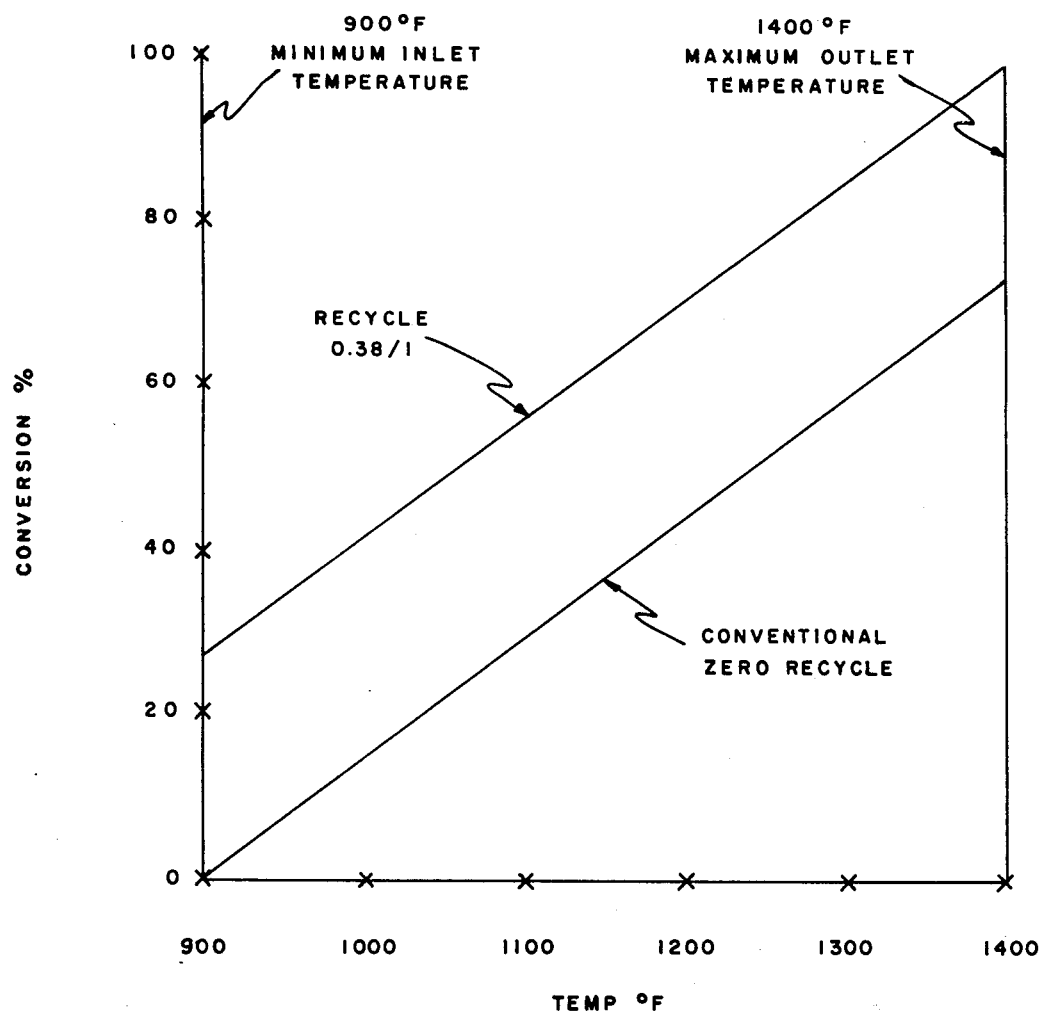
Figure 9:
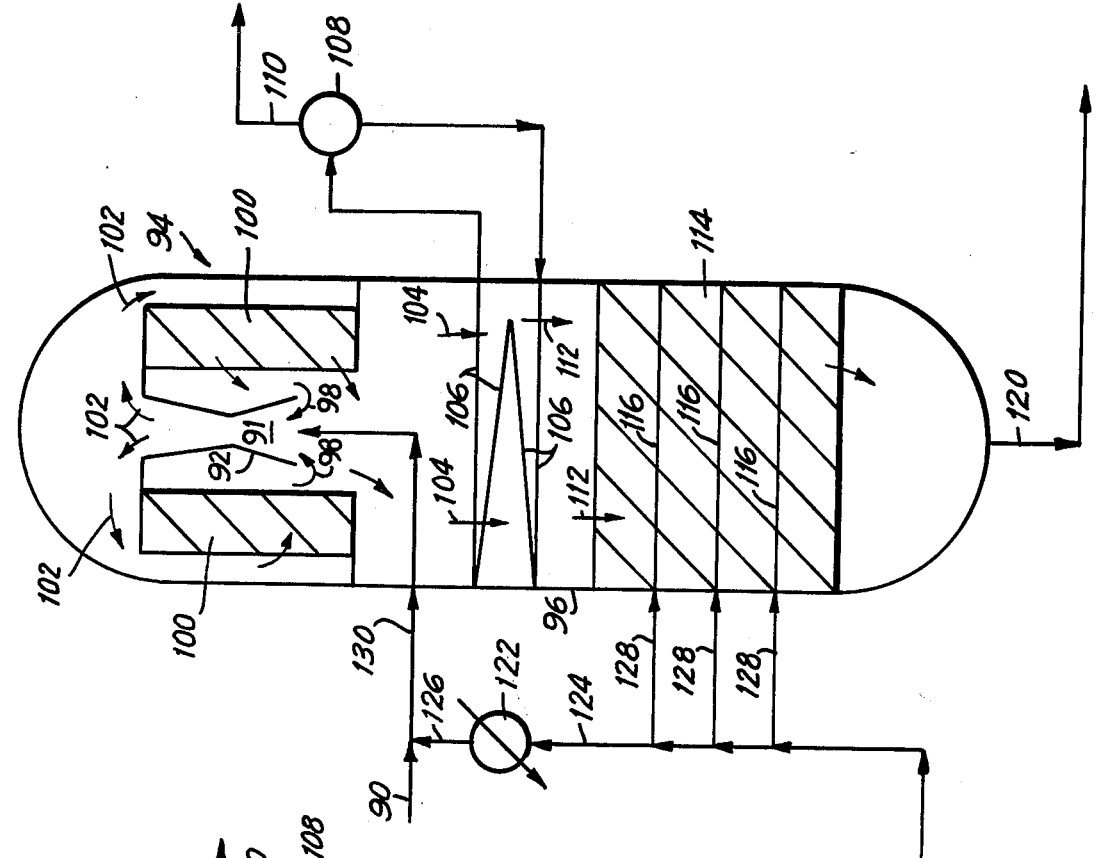
Figure 10:
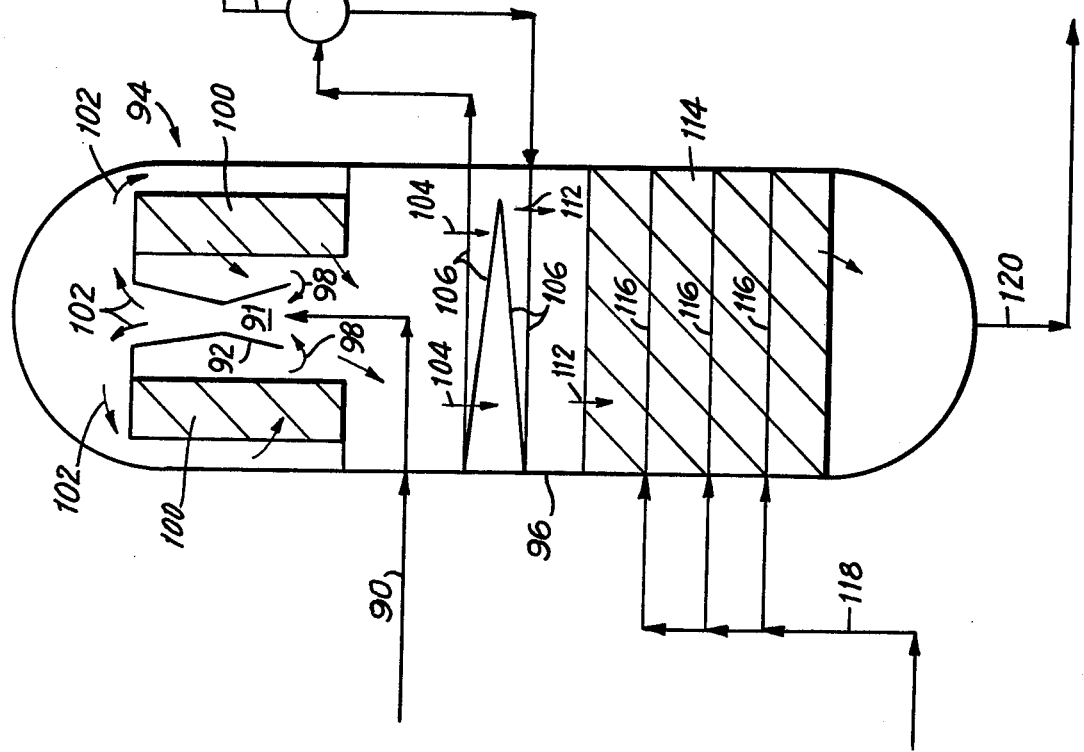
Figure 12:
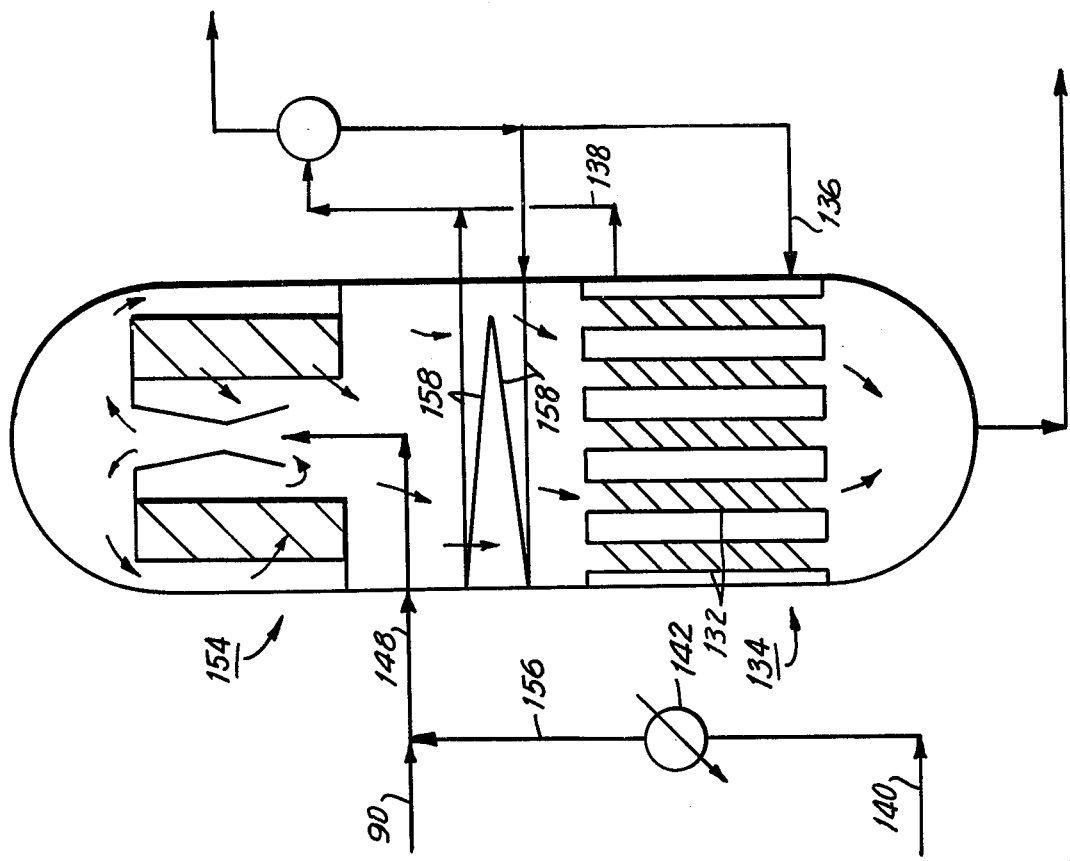
Figure 11:
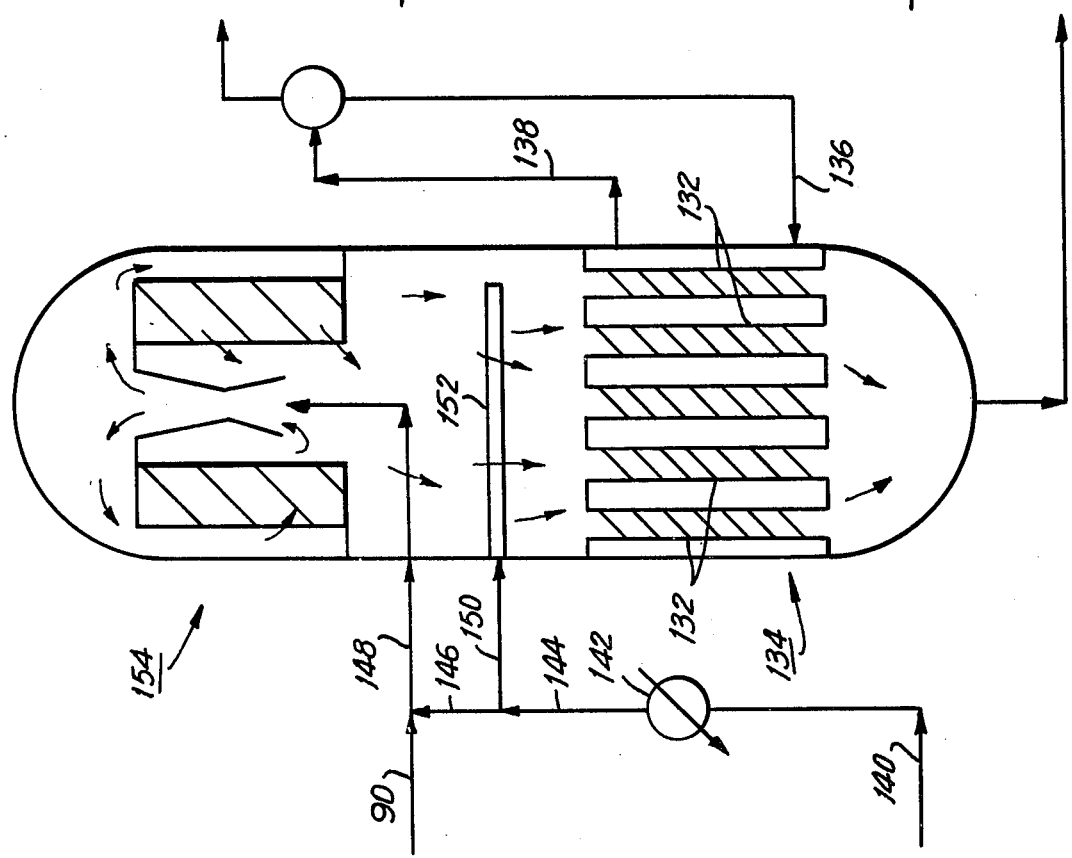

FIG. 4 presents a further catalytic converter configuration;

FIG. 5 is a sectional plan view of the cylindrical converter of FIG. 4, taken substantially along the line 5—5 of FIG. 4;

FIG. 6 shows still another converter configuration within the scope of the invention;

FIG. 7 is a plot of conversion vs. temperature for a computation model of a system for the catalytic oxidation of sulfur dioxide to sulfur trioxide, as applied to the cold gas produced in a metallurgical facility;

FIG. 8 is a plot of conversion vs. temperature for a computation model of a system for the treatment of tail gas from a nitric acid production facility, in which residual introgen oxides in the tail gas are eliminated by reaction with methane;

FIGS. 9 and 10 show alternative applications of the invention to a methanol synthesis quench converter; and FIGS. 11 and 12 show alternative applications of the invention to a methanol synthesis boiling-water converter.

DETAILED DESCRIPTION OF THE PREFERRED EMBODIMENTS

Figure 1:
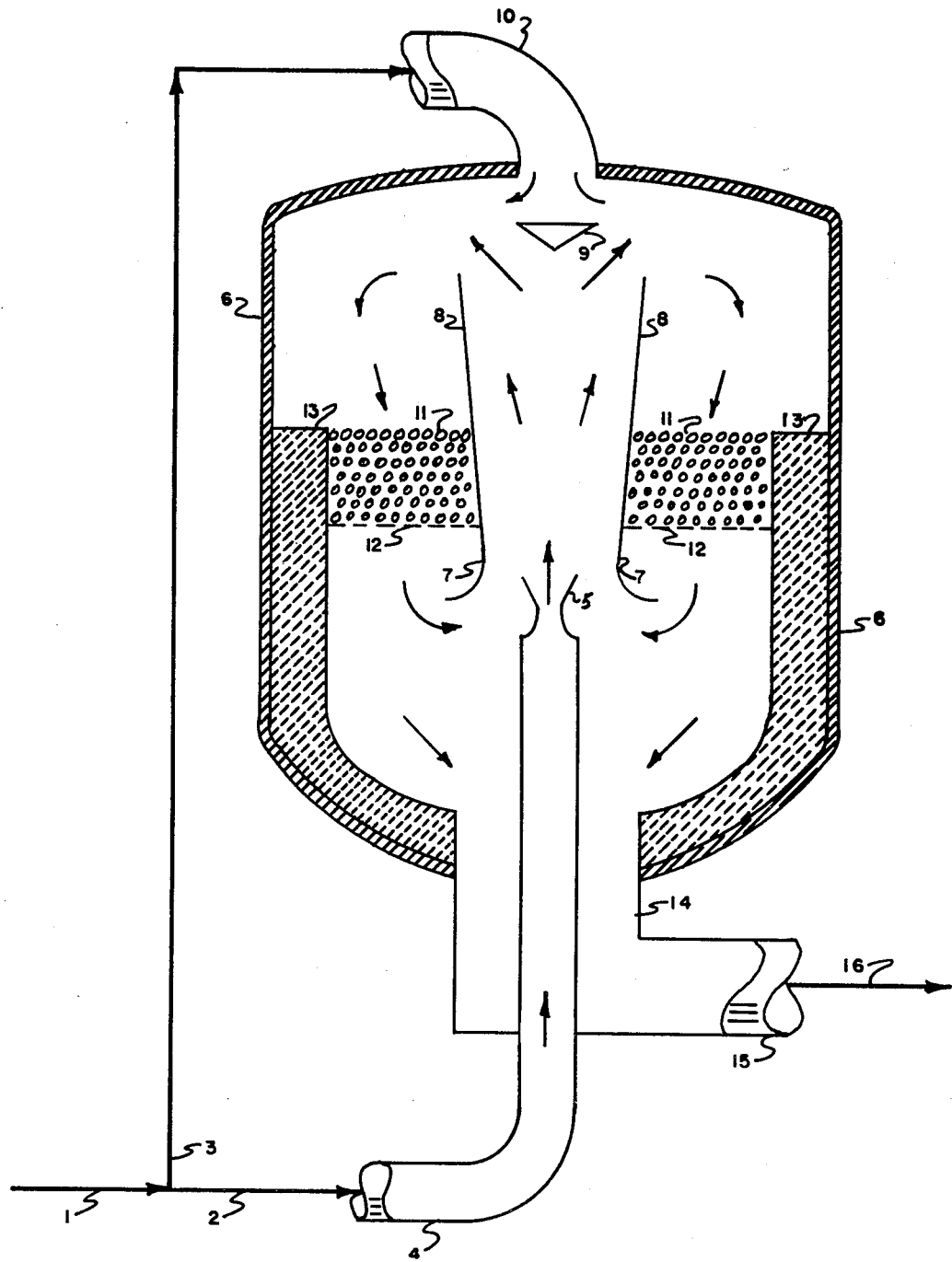
FIG. 1 is a sectional elevation view showing one arrangement of a catalytic converter and appurtenances thereto.

Referring now to FIG. 1, stream 1 is a fluid stream, typically a gaseous stream, which is to be subjected to an exothermic catalytic reaction. Stream 1 may be an oxygen and sulfur dioxide-containing gas stream, typically derived from metallurgical processing as a cold gas stream having a temperature in the range of 40° C, which is to be heated to initial catalysis temperature of about 550° C. Alternatively, stream 1 may be the tail gas from a nitric acid production facility to which reducing gas has been added, in which case stream 1 will be subject to catalysis for the elimination of nitrogen oxides. Stream 1 may also be a synthesis gas, such as an ammonia synthesis gas having approximately 3:1 molar ratio of hydrogen to nitrogen, in which case stream 1 will be subjected to catalysis for ammonia synthesis, or a methanol synthesis gas containing hydrogen and carbon oxides and suitable for catalytic methanol synthesis.

Stream 1 may be divided into main feed stream 2 and bypass stream 3. Stream 2 passes via inlet pipe 4 vertically upwards into the constricted throat element 5 of the centrally oriented aspirator or inductor which is disposed centrally within the generally vertically oriented cylindrical container or reactor 6. The curved annular aspirator element 7 is spaced from and mounted about element 5, so as to provide an annular passage between central element 5 and element 7 for aspiration or induction of a portion of the previously reacted hot fluid stream into the cold feed stream 2. The aspirated reacted fluid portion is drawn inwards and upwards by the aspirator action of the cold feed stream discharged upwards from element 5, and a combined stream flows upwards from section 7 into the flared or outwardly tapered central gas passage pipe 8, which may be in some instances of constant dimension but is generally of inverted frusto-conical configuration.

Pipe 8 serves to conduct the heated combined fluid stream upwards into the upper section of container 6, and an inverted conical central baffle 9 may be provided at or above the upper discharge end of pipe 8 to disperse the combined fluid stream outwards. The combined fluid stream flowing upwards within pipe 8 is now generally of a suitable temperature for the initiation of catalysis, however in some instances the combined fluid stream may be at a somewhat higher temperature than the optimum level. In this case, stream 3 passes via inlet pipe 10 into the top of container 6 and is dispersed into the combined fluid stream discharged from pipe 8. The flow rate of stream 3 is generally regulated by a flow control valve, not shown, which is adjusted by a temperature sensor such as a pneumatic element or a thermocouple which extends into the upper portion of unit 6, so that the temperature of the final combined fluid stream is maintained at an optimum level for initiation of catalysis.

The resulting final combined fluid stream now flows downwards into the annular catalyst bed 11 and an exothermic catalytic reaction of the fluid stream takes place within bed 11, which generally consists of a plurality of discrete particles of a carrier material having a suitable catalytic agent for the desired reaction deposited on the particles. The particles within bed 11 may be of a porous nature in which case a portion of the active catalytic agent will be absorbed within the pores of the particles. In other instances bed 11 may in practice consist of an annular honeycomb element or the like composed of a suitable refractory material, with the active catalytic agent being deposited on the surfaces of the parallel vertical passages of the honeycomb.

Bed 11 is supported on the foraminous grid or grate 12, and elements 11 and 12 extend outwards from pipe 8 to a layer 13 of refractory material which is provided on the lower inner surface of container 6 in order to protect the container 6 from excessive temperatures. The hot reacted fluid flowing downwards below element 12 now divides into a recycle portion which is aspirated or inducted into the cold feed fluid as described supra, and a final reacted fluid portion containing the product of the catalytic reaction which flows downwards out of container 6 via lower central outlet pipe 14 which is concentrically spaced about central pipe 4. The hot product fluid stream flow downwards in the annular passage between central pipe 4 and pipe 14, and is removed via pipe 15 as stream 16 which is passed to suitable product recovery or further processing as desired.

Figure 2:
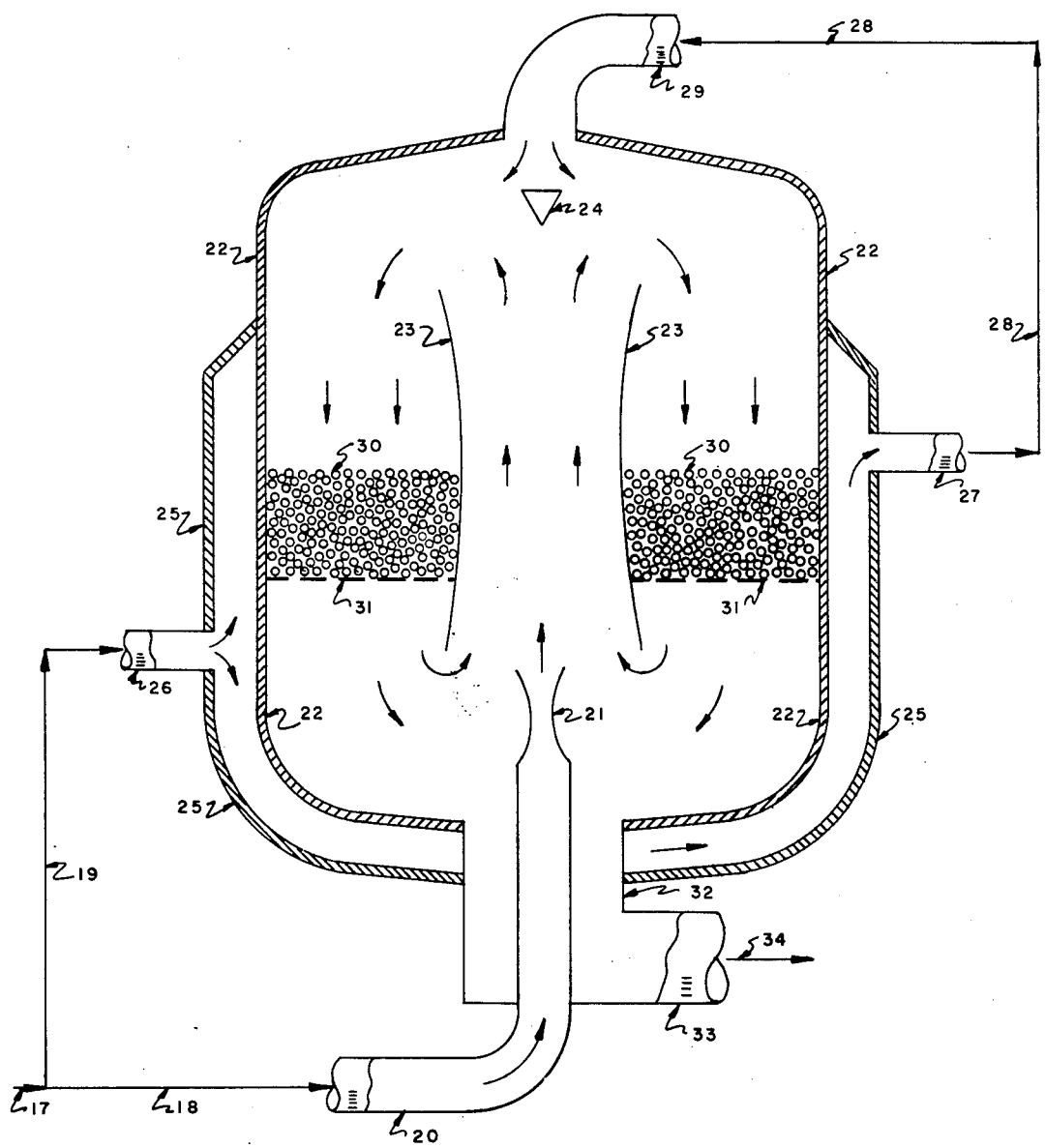
FIG. 2 is a sectional elevation view of an alternative catalytic converter arrangement and appurtenances thereto.

Referring now to FIG. 2, an arrangement similar to FIG. 1 is shown, except that an alternative expedient is provided to insulate the hot reacted fluid stream and to cool the lower portion of the reaction container. Cold feed stream 17 is divided into main feed stream 18 and bypass stream 19. Stream 18 flows via pipe 20 into central aspirator element 21, which is centrally oriented within container 22 and constricts the flow of the cold feed gas to provide high velocity and an aspiration effect. The high velocity feed gas is discharged into the generally flared outlet pipe 23 which may be of coned or arcuate vertical section, and hot reacted fluid is aspirated or inducted into the cold feed fluid within pipe 23. An inverted conical baffle 24 is preferably provided at the upper end of pipe 23, to distribute the hot combined fluid stream.

An insulating jacket 25 is provided about the lower portion of container 22. The jacket 25 is spaced from the outer wall of container 22 so as to provide an annular passage for flow of the bypass cold feed fluid stream 19, which is admitted into the annular flow passage via inlet pipe 26. The cold feed stream 19 circulates in the space between jacket 25 and container 22 and thereby provides a cooling and insulating effect. The resulting warmed feed fluid is removed from jacket 25 via outlet pipe 27 as stream 28, which flows via pipe 29 into the upper end of container 22 and is added to the combined fluid stream discharged upwards and outwards from pipe 23. The total combined fluid stream flows downwards through catalyst bed 30 which is supported on grate 31, and an exothermic catalytic reaction takes place within bed 30. The hot reacted fluid discharged below element 31 divides into a recycle portion which flows inwards around the lower end of pipe 23 and is aspirated into the cold feed fluid, and a hot product portion which flows downwards from the container 22 via the annular passage between pipe 20 and pipe 32 for discharge via pipe 33 as stream 34.

Figure 3:
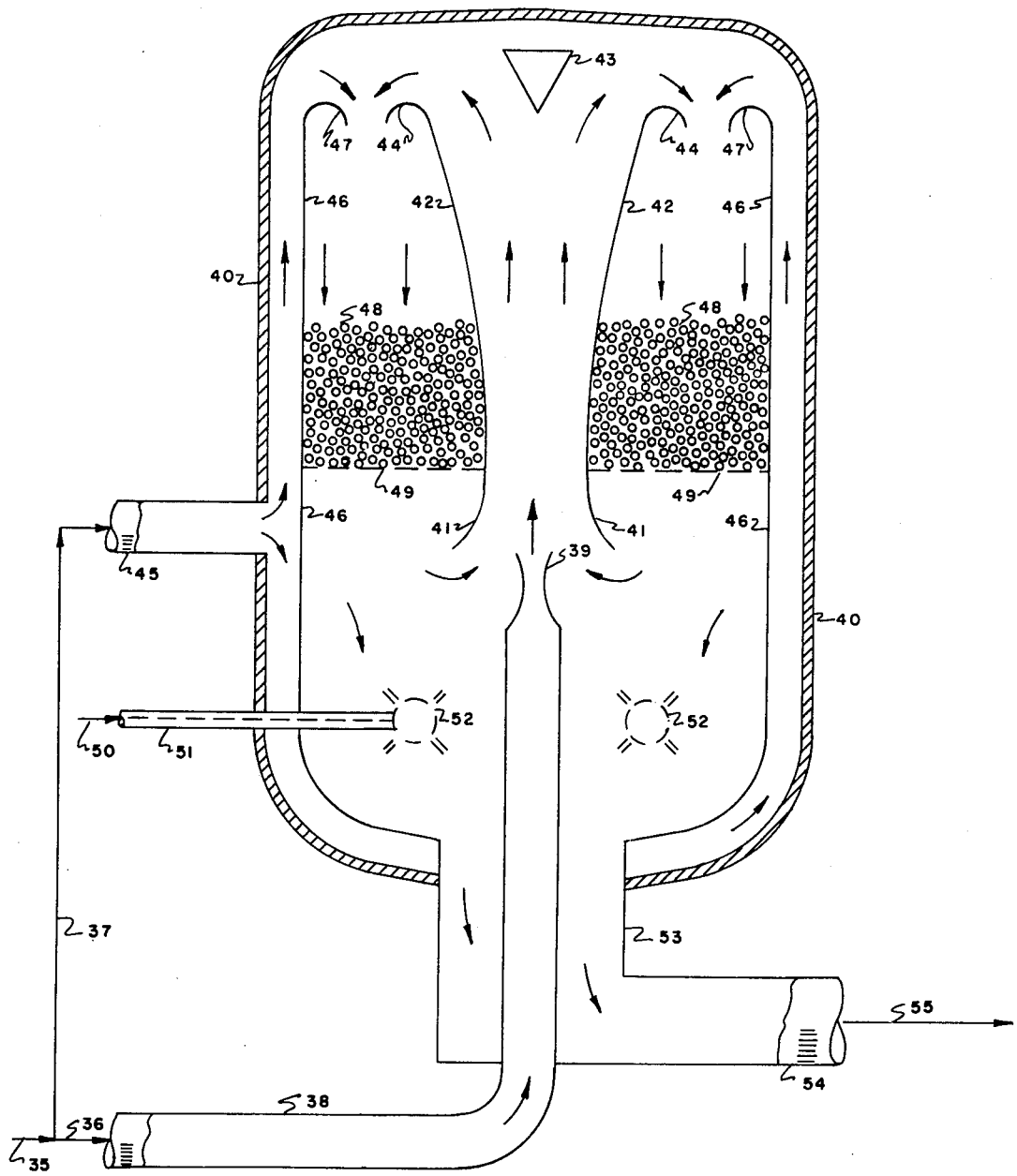
FIG. 3 is a sectional elevation view of still another catalytic converter.

Referring now to FIG. 3, a configuration similar to FIG. 2 is presented, except that internal annular cooling is provided as well as a lower quench for cooling product reacted fluid. Cold feed stream 35 is divided into the main feed stream 36 and bypass feed stream 37. Stream 36 flows via pipe 38 upwards to constricted aspiration flow passage unit 39, which is centrally located within container 40. Aspirator nozzle or ejector 39 cooperates with the curved annular aspirator element 41 to induct hot reacted fluid into the cold feed stream. The resultant warmed combined stream flows upwards through the generally inverted frustoconical pipe or duct 42, with upper inverted conical baffle being provided for annular flow diversion. A curved upper lip 44 is preferably provided at the upper end of element 42 in order to reduce fluid turbulence.

The cold bypass fluid stream 37 flows via inlet pipe 45 into the annular passage defined between the generally cylindrical container 40 and inner cylindrical baffle or plate 46, so that the circulation of cold bypass fluid between elements 40 and 46 serves to cool the container 40 in which the exothermic catalytic reaction takes place. This arrangement is especially desirable when the reaction is carried out at elevated pressure. The circulating cold bypass fluid is warmed between elements 40 and 46, and flows upwards and over the top of curved lip 47 which is provided at the upper end of element 46 to reduce fluid turbulence.

The warmed bypass fluid thus joins the main combined fluid stream at the upper end of container 40, and the total combined fluid stream next flows downwards in the annular passage between central pipe 42 and cylindrical baffle 46 and then through the annular catalyst bed 48 which is supported on grid or grate 49 and extends between elements 41 or 42 and baffle 46. An exothermic catalytic reaction of the combined fluid stream takes place in bed 48. The hot reacted fluid stream discharged below grid 49 now divides into recycle portion which is aspirated inwards below element 41 and upwards between elements 39 and 41 as described supra, and a product reacted fluid stream which flows downwards within baffle 46. The hot product stream is now quenched in situ within container 40. Quench fluid stream 50, which may in suitable instances consist of a liquid such as water or a condensed reaction product such as ammonia or methanol, is passed via pipe 51 to the foraminous hollow circular quench member 52, which is concentrically disposed in the lower portion of vessel 40 within member 46 and which sprays quench fluid into the hot product reacted fluid stream, in order to provide a cooling effect. The cooled product fluid stream next flows downwards in the annular passage between central pipe 38 and pipe 53, and passes to product recovery or other utilization via pipe 54 as stream 55.

Referring now to FIG. 4, an alternate integral configuration is provided, to attain vessel wall cooling as well as radial inward flow through an annular bed, which permits the provision of a longer diffuser and better mixing. Cold feed stream 56 is divided into the main feed stream 57 and bypass stream 58. Stream 57 flows via central pipe 59 into aspiration element 60, from which the cold feed fluid is discharged upwards at high velocity. Nozzle element 60 is centrally oriented within the generally vertically oriented cylindrical reaction vessel 61. Element 60 cooperates with the flared aspirator inlet element 62, so that hot reacted fluid is aspirated or inducted into the cold feed fluid and a combined fluid stream at intermediate temperature flows upwards through the inverted frusto-conical pipe 63, which extends upwards to the upper end of the vessel 61. An inverted conical baffle 64 is provided adjacent to the upper outlet of pipe 63 to divert the combined fluid stream laterally outwards above the flat horizontal ring-shaped baffle 65.

The cold bypass feed fluid stream 58 is passed via upper pipe 66 into the upper end of the vessel 61 and combines with the main process stream above baffle 65 to provide a quench-cooling effect. The resultant total combined fluid stream now flows downwards between the inner wall of vessel 61 and the generally vertically oriented foraminous support baffle 67, which extends downwards from baffle 65 to the bottom of vessel 61. The process fluid stream flows radially inwards through the plurality of openings in baffle 67 and through the vertically oriented generally cylindrical catalyst bed 68 which is disposed between baffle 67 and inner foraminous cylindrical baffle 69, which also extends vertically between upper baffle 65 and the bottom of container 61 and which is generally parallel to baffle 67.

The hot reacted fluid flowing radially inwards from baffle 69 is diverted downwards by pipe 63, and flows towards the lower end of the container 61 between baffle 69 and pipe 63. A portion of the hot reacted fluid is aspirated inwards below element 62 and into the cold feed fluid as described supra. The balance of the hot reacted fluid containing product is passed downwards between central pipe 59 and pipe 70 and is withdrawn via pipe 71 as stream 72.

FIG. 5 is a sectional plan view of FIG. 4 taken on section 5—5, and shows the concentric coaxial arrangement of the several apparatus elements such as elements 60, 63, 69, 67 and 61, as well as the radial inward flow of the process fluid stream.

Referring now to FIG. 6, a multiple integral configuration is provided as may be desirable for larger capacity units or for savings in height for "flat" configurations. Cold stream 73 is admitted through an inlet nozzle 74 to plenum chamber 75 with upper surface 76. The upper surface 76 is perforate and has formed from or assembled to its respective openings a corresponding multiplicity of constricted throat elements 77. The lower surface 87 may have formed from it or assembled with it a multiplicity of flow enhancers 88 coordinate to the respective throat elements 77.

The constricted throat elements 77 cooperate with a multiplicity of curved annular aspirator elements 78. The cold feed 73 divides between the multiplicity of throat elements 77 and inducts hot reacted fluid on passing into the corresponding multiplicity of aspirator elements 78. The resultant multiplicity of warmed combined streams flow upwards through the generally inverted frusto-conical diffusers 79 and then downward through catalyst bed 80 which is supported on grate 81, and an exothermic catalytic reaction takes place within bed 80. The hot reacted fluid discharged below element 81 divides into a multiplicity of recycle portions which flow inwards around the lower ends of aspirator elements 78 into the respective cold feed fluid streams issuing from the multiplicity of throat elements 77, and a hot product portion which flows outward for discharge via pipe 82 as stream 83.

The overall assembly 84 may be provided as an independent vertical-axis cylindrical vessel with flat or formed heads or may be provided as a vertical-axis cylindrical section of a taller vertical-axis cylindrical vessel made up of more than one such section. The top surface 85 of the section or assembly may have formed from it or arranged with it or arranged with the diffusers 79 a multiplicity of flow diverters 86 cooperating with said diffusers 79.

Numerous alternatives within the scope of the present invention will occur to those skilled in the art. The invention is generally applicable to exothermic reactions in general, however the invention is especially applicable to catalytic reactions which are exothermic and which may be carried out in the gaseous or liquid phases. Typical catalytic reactions to which the invention is applicable have been mentioned supra, however the invention is also applicable to other catalytic reactions which are exothermic such as the water gas shift reaction between carbon monoxide and steam to produce hydrogen and carbon dioxide or catalytic methanation of oxides of carbon with hydrogen or automobile tail gas reactions. Numerous other suitable catalytic reactions will occur to those skilled in the art. In instances such as the processing of nitric acid plant tail gas to eliminate nitrogen oxides by reaction with reducing gas, the final hot product reacted gas stream may be discharged to atmosphere, usually after expansion through a gas turbine for power recovery. The container or reaction vessel 6, 22, 40 or 61 is preferably a vertically oriented cylindrical vessel, however other configurations known to the art may be provided in practice. In some instances streams 3, 19, 37 or 58; and-/or baffles 9, 24, 43 or 64 may be omitted in practice. In instances when a catalytic reaction is being practiced, a suitable catalyst for the particular reaction will be provided, such as the catalytic agents and formulations mentioned in the parents enumerated supra, and the active catalytic agent will usually be deposited on a suitable carrier which may be in a spherical, cubic, prismatic pellet or honeycomb form. The container vessels may be of oblong or other forms as well as cylindrical and with internal configurations to suit. Orientations may be according to the respective FIGS. 1–6 or may be of generally upside-down or opposite or otherwise suitable arrangement. The invention is also applicable to a catalytic reaction in which catalysis is carried out in a plurality of catalyst beds in series, in which case the invention may be applied to one, several or all of the catalyst beds.

An example of application of the present invention to the cold gas produced in a metallurgical facility and containing sulfur dioxide and oxygen, which is to be heated and processed for the catalytic production of sulfur trioxide, will now be described.

It may be observed that the invention in its maximized retention of reaction heat is operating in a manner that is normally considered quite undesirable to exothermic catalytic processes, and furthermore and even surprisingly as compared to conventional concepts has been found to be of benefit to and has been utilized to improve the respective overall systems.

EXAMPLE I

The invention was applied in computation model to a cold gas from copper converting containing about 7% $SO_2$, 12% $O_2$, 81% $N_2$. A modelling procedure was utilized approximately parallel to the computation methods and references of Calderbank, P.H. "Contact Process Converter Design" CEP Nov 53 pages 585–590. The first catalyst bed only was considered. A recycle ratio (recycle-gas/make-up-gas) of 2/1 was taken arbitrarily for the pre-optimization sample. The approach to equilibrium at the bed outlet was taken arbitrarily at 60° F. and was considered for both a zero recycle and a 2/1 recycle case. The results may be considered in terms of comparison of conversion obtainable in the first bed, and of heat exchanger requirements for preheat of the feed gas to the first bed. For approximately identical quantity of first bed catalyst in both cases, the conversion is in the range of 10% higher for the recycle system, and therefore providing as well savings to subsequent stage catalyst requirements. In addition, the preheating thermal requirements are in the range of 20% less for the recycle system and the exchanger surface in the range of 30% less. Following is a summary of data relative to the improved results.

| Conversion Data | | Conventional Operation | Recycle 2/1 |
|---|---|---|---|
| Make-up to Catalyst | % $SO_2$ | 7.00 | 7.00 |
| Recycle/Make-up | (1) | 0 | 2/1 |
| Conversion Ex. Cat | (2) | 72.0 | 82.0 |
| Gas Ex. Catalyst | M—$SO_3$ | 5.04 | 5.74 |
| " | M—$SO_2$ | 1.96 | 1.26 |
| " | $SO_3$ + $SO_2$ | 7.00 | 7.00 |
| Recycle to Catalyst | M—$SO_3$ | 0 | 11.48 |
| " | M—$SO_2$ | 0 | 2.52 |
| " | $SO_3$ + $SO_2$ | 0 | 14.00 |
| Make-up to Catalyst | M—$SO_3$ | 0 | 0 |
| " | M—$SO_2$ | 7.00 | 7.00 |
| " | $SO_3$ + $SO_2$ | 7.00 | 7.00 |
| Recycle + Make-up | M—$SO_3$ | 0 | 11.48 |

-continued

| Conversion Data | | Conventional Operation | Recycle 2/1 |
|---|---|---|---|
| " | M—SO$_2$ | 7.00 | 9.52 |
| " | SO$_3$ + SO$_2$ | 7.00 | 21.00 |
| Conversion to Cat. | (2) | 0 | 54.7 |

(1)Moles ratio (SO$_3$ + SO$_2$)/(SO$_3$ + SO$_2$)
(2)Moles percent SO$_3$/(SO$_3$ + SO$_2$)

| Temperature Data | | Conventional Operation | Recycle 2/1 |
|---|---|---|---|
| Recycle/Make-up | (1) | 0 | 2/1 |
| (R + M)/Make-up | (1) | 1/1 | 3/1 |
| Conversion Ex. Cat | % | 72.0 | 82.0 |
| Equilibrium | °F. | 1,140 | 1,070 |
| Equil. Approach | °F. | 60 | 60 |
| Gas Ex. Catalyst | °F. | 1,080 | 1,010 |
| Make-up Gas Rise | °F. | 268 | 306 |
| (R + M)/Make-up | (1) | 1/1 | 3/1 |
| Average Gas Rise | °F. | 268 | 102 |
| Gas to Catalyst | °F. | 812 | 908 |
| Gas Ex. Catalyst | °F. | 1,080 | 1,010 |
| Make-up Gas Rise | °F. | 268 | 306 |
| Make-up Gas Temp | °F. | 812 | 704 |

(1)Moles ratio (SO$_3$ + SO$_2$)/(SO$_3$ + SO$_2$)

| Exchanger Data | | Conventional Operation | Recycle 2/1 |
|---|---|---|---|
| Make-up Gas Temp. | °F. | 812 | 704 |
| Cold Make-up Gas | °F. | 150 | 150 |
| Exchanger Rise | °F. | 662 | 554 |
| Thermal Requirement | % | 100 | 83.7 |
| Gas Ex. Catalyst | °F. | 1,080 | 1,010 |
| Hot Make-up Gas | °F. | 812 | 704 |
| Exchanger Delta | °F. | 268 | 306 |
| Exchanger Rise | °F. | 662 | 554 |
| Rise/Delta | °F. | 2.47 | 1.81 |
| Exchanger Surface | % | 100 | 73.3 |

A plot of conversion versus temperature for the system is shown as FIG. 7. The relationship of the respective operating lines for the conventional operation and for the recycle 2/1 may be noted.

An example of application of the present invention to the tail gas from a nitric acid production facility, in order to react residual nitrogen oxides with methane in order to eliminate the nitrogen oxides and thereby prevent air pollution, will now be described.

The invention was applied in computation model to a gas carrying total nitrogen oxides equivalent to 0.4% NO$_2$ plus 2.6% O$_2$ and 97% N$_2$. The catalyst used in the computation model was honeycomb type with minimum inlet temperature of 900° F. for maintaining of catalyst ignition and maximum outlet temperature of 1,400° F. for avoidance of catalyst deterioration.

Thermal data for the computation model were taken from "JANAF Thermochemical Tables" (Second Edition, June 1971, Office of Standard Reference Data, National Bureau of Standards, Washington, D.C. 20234). The adiabatic temperature rise associated with the use of methane for reduction of the total tail gas 3.0% O$_2$(The free oxygen 2.6% O$_2$ plus the combined oxygen contained in the 0.4% NO$_2$) over the indicated 900° F. to 1,400° F. temperature range was determined to be approximately 230° F. per each 1.0% total O$_2$ reacted.

The maximum permissible total oxygen content consistent with single-stage catalyst operation within the above temperature limitations was then found from the computation model relationship (1,400–900)/230 to be approximately 2.18% O$_2$. The minimum recycle ratio for the gas with the total 3.0% O$_2$ was in turn found from the relationship 3.0/2.18 to be 1.38 volumes of recycle plus make-up per 1.0 volumes of make-up gas or a recycle/make-up ratio of 0.38/1.0 volume per volume.

The required preheat temperature of the 3.0% total O$_2$ make-up gas in accord with the above constraints was then found from the computation model relationship 1,400 − 3.0 × 230 to be approximately 710° F. The attainment of the limiting 900° F. catalyst minimum inlet temperature following mixing of the 1,400° F. recycle gas with such 710° F. make-up gas and allowing for the recycle/make-up ratio of 0.38/1.0 was verified from the computation model relationship 1,400-(900-710)(1.0/0.38) or thereby meeting the 900° F. requirement.

A plot of conversion versus temperature for the system is shown as FIG. 8. The relationships of the respective operating lines for the conventional operation of zero recycle and the above determined recycle ratio of 0.38/1 may be noted. It is clear that within the constraints of the example and for single-stage adiabatic operation that full end gas conversion can be obtained readily with the recycle feature but not at all with the conventional practice. In the case of the 0.38/1 recycle/make-up, the effective conversion of the mixed gas (recycle plus make-up) to the catalyst was found from the computation model relationship (3.0 - 3.0/1.38)/3.0 to be 27.5%.

FIGS. 9 and 10 are two alternates showing the fit of the process of the present invention to a quench type of methanol process. The process of the invention is applied as a first stage preceding the conventional quench sections. Thus FIGS. 9 and 10 are indicative of prospective fits or applications of the invention to various conventional catalyst systems, which applications in a particular instance will be optimized to the specific case. As can be seen from FIGS. 9 and 10, the conventional loop interchanger (converter gas preheater) is eliminated, or at least much reduced (FIG. 10), in reflection of the inherent ability of the process of the present invention to bootstrap directly from colder (much colder) temperatures than conventional catalyst supply (e.g. "ignition" or "light-off" or "sustaining" etc.) temperatures.

FIG. 9 shows the arrangement for complete elimination of the conventional loop interchanger, via internal jet recycle of the present invention as applied to a quench converter type of methanol synthesis process. Compressor discharge stream 90 is fed directly (without aftercooling and without preheat) at a temperature in the range of about 150° to 210° C. to the nozzle 91 of the internal recycle jet section 94 of the quench-type methanol synthesis converter 96. The nozzle action in 91, disposed within diffuser 92, induces recycle of portions 98 of reacted gas, which is at a temperature typically in the range of about 260° to 300° C. and which is discharged from the first stage catalyst bed 100. For a recycle to makeup ratio (of streams 98 to stream 90) of 1.5/1, the resulting mixed gas streams 102 actually feeding to the first stage catalyst bed 100 would be obtained at a conventional catalyst supply temperature of approximately 240° C.

The balance of the converter internals in FIG. 9 includes heat recovery via steam generation, and further catalysis with interbed quench. The net reacted gas from the upper internal recycle jet section 94 flows via streams 104 through steam coil 106, in which condensate or boiler feed water is heated and vaporized to generate medium pressure steam which is drawn off from steam drum 108 via stream 110 at a steam pressure typically in the range of 300 to 500 psig. Process gas streams 104 are cooled via indirect heat exchange with the water in coil 106 from an initial temperature typically in the range of 260° to 300° C., to a lower temperature (streams 112) of about 240° C. which is suitable for further catalysis. Streams 112 now pass into the quench section 114 of converter 96. Quench gas distributors 116 pass portions of cold quench gas stream 118, derived from the circulator at a temperature typically in the range of 40° to 100° C., into the catalyst bed in section 114. A final fully reacted gas stream 120 is removed from the bottom of converter 96, typically at the temperature in the range of 250° to 290° C. Stream 120 typically first passes to heat recovery via boiler feed water preheat, not shown, and then to product methanol recovery in a conventional sequence, not shown.

FIG. 10 is similar to FIG. 9, except that FIG. 10 shows an arrangement for utilization of a low temperature net circulator gas preheater 122 for preheating of net circulator gas stream 124 from an initial temperature typically in the range of 40° to 100° C., to a final temperature (stream 126) comparable to that of stream 90, namely in the range of about 150° to 210° C. Compressor discharge stream 90 is fed directly (without aftercooling and without preheat) at 150° to 210° C., to be joined by net circulator gas stream 126, which is the quantity remaining in excess of quench-required cold-shot supply streams 128. Stream 126 is generally preheated to a temperature closely matching that of stream 90. The stream 130 formed by adding stream 126 to stream 90 is a mixture of these two gas streams, and the mixture is supplied to the nozzle of the internal jet system as in FIG. 9 described supra, and the balance of the operation then being obtained in equivalence to that described previously.

Typical temperature values for the streams of FIGS. 9 and 10 are as follows:

| Stream No. | Temp. ° C. |
| --- | --- |
| 90 | 180° C. |
| 98 and 104 | 280° C. |
| 102 | 240° C. |
| 112 | 240° C. |
| 118 | 60° C. |
| 120 | 260° C. |
| 124 | 60° C. |
| 126 | 180° C. |

These conditions typically apply with a recycle/makeup ratio of 1.5/1 in the internal recycle jet section 94, and under these conditions steam stream 110 will typically be withdrawn at 425 psig. The actual requirements and modes of utilization are of course subject to optimization according to preferred process conditions, but the general directions for application of the process of the invention and its impacting for substantial benefits are clear.

The bootstrap feature allows the gas coming into the total catalyst system (fresh feed makeup to first bed as well as cold-shot makeup to succeeding quench beds) to be at the original "natural" temperatures of 180° C. and 60° C. as shown supra in FIG. 9, or with minimal exchanger preheat added as in FIG. 10 (still much below conventional catalyst supply temperatures). This compares with the conventional system's requirement for first bed all-exchanger preheat to full catalyst supply temperatures of about 240° C. This means that for the total loop gas (first bed feed plus quench bed shots), from entry to converter circuit (thermal envelope) to exit of converter circuit (thermal envelope), the overall average rise in temperature (without increase in maximum temperature), and therefore total extent of reaction and degree of conversion is equivalently greater for the process of the invention, and the required external or overall loop recycle ratio is thereby equivalently lesser. The advantages of lower loop recycle ratio are clear. Among the other benefits that may be derived from the above, additional to the lower loop recycle ratio (and in fact companion to the lower loop recycle ratio), are options for heat recovery additional to the conventional. FIGS. 9 and 10 show medium pressure steam recovery. The total heat recovery (e.g. steam plus feedwater or feedwater only), in any case, will be greater for the process of the present invention than for the conventional.

FIGS. 11 and 12 show the present internal jet recycle invention as applied to a methanol synthesis converter of the boiling-water type, in which the succeeding catalyst bed in the lower portion of the converter is disposed in tubes 132 of a shell-and-tube heat exchanger section 134, with condensate or boiler feed water stream 136 being circulated through the shell to generate steam stream 138. In addition, FIG. 11 is an alternate with partial remixing of gases, i.e. gas stream 140 derived from the circulator typically at a temperature of about 60° C. flows through low temperature preheater 142 and the resulting gas stream 144, now typically at about 180° C., is split into two portions, with partial remixing of gases being accomplished by adding portion stream 146 to stream 90 derived from the compressor typically at about 180° C. The resulting mixed stream 148 flows to the internal recycle jet section as before described with regard to FIG. 9. The other portion of stream 144 consisting of stream 150 is passed into the converter via gas distribution sparger 152, to cool the process gas between the upper internal recycle jet section 154 and the lower shell-and-tube heat exchanger section 134, typically from a temperature of about 280° C. to a temperature of about 240° C. FIG. 12 shows full or total remixing of gases, with stream 140 from the circulator flowing through low temperature preheater 142 and the entire gas stream 156 now at about 180° C. being combined with stream 90. Cooling between sections 154 and 134 is attained by the provision of cooling coil 158 which is similar in configuration and function to steam coil 106 described supra, i.e. water is vaporized to steam in coil 158 with concomitant cooling of the process gas stream by indirect heat exchange.

It thus will be seen that there is provided a process and apparatus for exothermic catalytic reactions which achieves the various objects of the invention and which is well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

The present application includes in part subject matter disclosed in U.S. Pat. No. 3,941,869 of common inventorship.

Having thus described the invention, there is claimed as new and desired to be secured by Letters Patent:

1. A process for the exothermic catalytic reaction of a gas stream to catalytically synthesize a chemical compound selected from the group consisting of ammonia, methanol, methane, hydrogen, and sulfur trioxide when formed by an exothermic reaction which comprises accelerating a cold unreacted feed gas stream to a high velocity in a constricted gas flow zone, aspirating a hot recycle gas stream derived from said exothermic catalytic gas stream reaction into the high velocity cold feed gas stream, whereby a combined gas stream is formed at intermediate temperature, passing said combined gas stream by means of and inside of one or more conduits at least once internally through at least one catalytic reaction zone without direct contact with said catalytic reaction zone, removing said combined gas stream from said one or more conduits and passing said combined gas stream now outside of said one or more conduits again through said at least one catalytic reaction zone, catalytically reacting said combined gas stream in said at least one catalytic reaction zone, whereby an exothermic catalytic reaction takes place in said catalytic reaction zone and a hot catalytically reacted gas stream is discharged from said catalytic reaction zone, dividing said hot catalytically reacted gas stream into a first portion and a second portion, both of said portions being of identical composition, recycling the first portion of said hot catalytically reacted gas stream as said hot recycle gas stream, and withdrawing the second portion of said hot catalytically reacted gas stream as a product catalytically reacted gas stream.

2. The process of claim 1 in which the chemical compound is ammonia and the cold unreacted feed gas stream is an ammonia synthesis gas stream principally containing nitrogen and hydrogen.

3. The process of claim 1 in which the chemical compound is methanol and the cold unreacted feed gas stream is a methanol synthesis gas stream principally containing hydrogen and carbon oxides.

4. The process of claim 1 in which the chemical compound is methane and the cold unreacted feed gas stream contains carbon oxides and hydrogen.

5. The process of claim 1 in which the chemical compound is hydrogen and the cold unreacted feed gas stream contains carbon monoxide and water vapor.

6. The process of claim 1 in which the chemical compound is sulfur trioxide and the cold unreacted feed gas stream contains sulfur dioxide and oxygen.

7. The process of claim 6 in which said feed gas is produced by processing including the heating of a sulfur-containing solid to generate a hot crude gas stream containing sulfur dioxide, and the scrubbing of said hot crude gas stream with a liquid to remove entrained solid particles whereby a cold gas stream substantially free of entrained solids is produced.

8. The process of claim 7 in which said sulfur-containing solid is a mineral sulfide and said liquid consists essentially of aqueous media.

9. The process of claim 6 in which said feed gas is produced by the burning of sulfur-containing sludge acid to generate a hot crude gas stream containing sulfur dioxide, and the scrubbing of said hot crude gas stream with aqueous media to remove entrained solid particles, whereby a cold gas stream substantially free of entrained solids is produced.

10. A process for the exothermic catalytic reaction of a gas stream to catalytically synthesize a chemical compound selected from the group consisting of ammonia, methanol, methane from reaction of carbon oxides plus hydrogen, hydrogen from reaction of carbon monoxide plus water vapor, and sulfur trioxide when formed by an exothermic reaction which comprises accelerating a cold unreacted feed gas stream to a high velocity in a constricted gas flow zone, aspirating a hot recycle gas stream derived from said exothermic catalytic gas stream reaction into the high velocity cold feed gas stream, whereby a combined gas stream is formed at intermediate temperature, passing said combined gas stream by means of and inside of one or more conduits inside of a reaction vessel from at least one catalytic reaction discharge zone to at least one catalytic reaction supply zone, removing said combined gas stream from said one or more conduits and passing said combined gas stream now outside of said one or more conduits through at least one catalytic reaction zone still within said catalytic reaction vessel, reacting said combined gas stream in said at least one catalytic reaction zone, whereby an exothermic catalytic reaction takes place in said catalytic reaction zone and a hot catalytically reacted gas stream is discharged from said catalytic reaction zone, dividing said hot catalytically reacted gas stream into a first portion and a second portion, both of said portions being of identical composition, recycling the first portion of said hot catalytically reacted gas stream as said hot recycle gas stream, and withdrawing the second portion of said hot catalytically reacted gas stream as a product reacted gas stream.

* * * * *